United States Patent
Wu

(10) Patent No.: US 6,728,109 B1
(45) Date of Patent: Apr. 27, 2004

(54) COMPUTER DRIVE ANCHORING APPARATUS WITHOUT USING SCREWS

(75) Inventor: Wen-Liang Wu, Tainan (TW)

(73) Assignee: Cotytech Industrial Inc., Kun Shan (CN)

( * ) Notice: Subject to any disclaimer, the term of this patent is extended or adjusted under 35 U.S.C. 154(b) by 0 days.

(21) Appl. No.: 10/443,985

(22) Filed: May 23, 2003

(51) Int. Cl.⁷ .............................. H05K 7/00; H05K 5/00; H05K 7/02; H05K 7/04; G06F 1/16
(52) U.S. Cl. .................... 361/747; 361/684; 361/685; 361/755; 361/807
(58) Field of Search ................. 361/728, 732, 361/740, 741, 747, 752, 755, 756, 796, 800, 801, 802, 803, 807, 809, 724–727, 683–686; 312/223.1, 223.2, 223.3; 211/41.17

(56) References Cited

U.S. PATENT DOCUMENTS

| 5,398,157 A | * | 3/1995 | Paul ............................ 361/684 |
| 5,587,879 A | * | 12/1996 | Spano et al. ................. 361/685 |
| 5,680,293 A | * | 10/1997 | McAnally et al. ........... 361/685 |
| 5,768,099 A | * | 6/1998 | Radloff et al. ............... 361/685 |
| 5,777,848 A | * | 7/1998 | McAnally et al. ........... 361/725 |
| 5,788,211 A | * | 8/1998 | Astier ........................ 248/674 |
| 5,943,208 A | * | 8/1999 | Kato et al. ................... 361/685 |
| 6,058,007 A | * | 5/2000 | Eckert et al. ................ 361/684 |
| 6,377,446 B1 | * | 4/2002 | Liau ........................... 361/683 |
| 6,377,449 B1 | * | 4/2002 | Liao et al. ................... 361/685 |
| 6,437,977 B1 | * | 8/2002 | Yu .............................. 361/685 |
| 6,452,792 B1 | * | 9/2002 | Chen ........................... 361/685 |
| 6,530,551 B2 | * | 3/2003 | Gan ............................ 248/694 |

* cited by examiner

Primary Examiner—Phuong T. Vu
(74) Attorney, Agent, or Firm—Birch, Stewart, Kolasch & Birch, LLP

(57) ABSTRACT

An anchoring apparatus for computer drives without using screws includes an anchor plate coupling on two struts located on an installation rack of the drives. The anchor plate pivotally and respectively engages with an actuating member on the left side and the right side through stub shafts. The anchor plate has anchor stubs corresponding to anchor holes of the installation rack. Each strut is coupled with a returning spring. The actuating member has a driving lever on an outer side and an inner side extended to form a driven end. The driving lever may be moved to a returning position thereby to replace and install the drive without disassembling screws.

9 Claims, 5 Drawing Sheets

COMPUTER DRIVE ANCHORING APPARATUS WITHOUT USING SCREWS

FIELD OF THE INVENTION

The present invention relates to accessories of computer casing and particularly to an anchoring apparatus adopted for use on computer drives such as optical disk drives, hard disk drives and floppy disk drives that directly anchors or unfastens the drives with hands.

BACKGROUND OF THE INVENTION

A computer casing generally contains and anchors various drives such as hard disk drives, floppy disk drives, optical disk drives and the like. The commonly used computer casing nowadays has a rectangular drive installation rack to house the drives. Each drive has two sides in contact with the drive installation rack, then the drive is anchored on the drive installation rack by means of screws. The drive of a larger size usually requires eight screws, while the drive of a smaller size requires four screws. Installation or removing of the drive needs a screw driver to tighten or loosen the screws. As the interior space of the casing is limited, turning and operation of the screw driver is inconvenient. Thus installation or disassembly is quite awkward.

SUMMARY OF THE INVENTION

The primary object of the invention is to provide a computer drive anchoring apparatus without using screws. Operation is performed by hands without using any tools. Installation and disassembly may be accomplished rapidly and conveniently.

In order to achieve the foregoing object, the computer drive anchoring apparatus without using screws according to the invention includes an anchor plate coupling on two struts located on a drive installation rack. The anchor plate has stub shafts on the left side and the right side to pivotally engage with an actuating member. The anchor plate further has anchor stubs corresponding to anchor holes formed on the drive installation rack. Each strut is coupled with a restoring spring. The actuating member has a driving lever on an outer side and a driven end extended from an inner side to enable the driving lever to reach a return position when moved. Thereby the drive may be installed or removed for replacement without using tools to unfasten screws.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
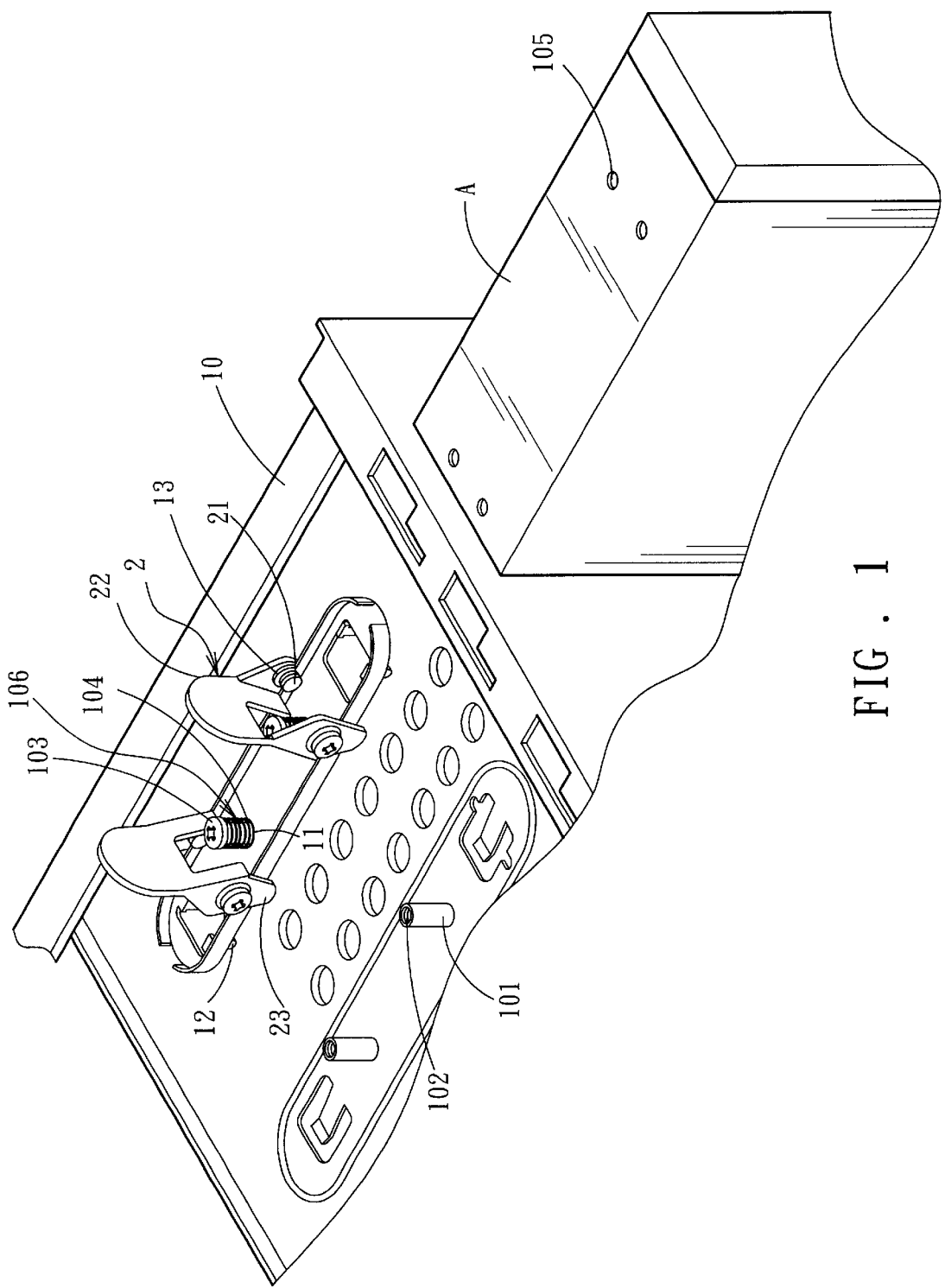
FIG. 1 is a perspective view of the invention mounted onto a computer installation rack.
Figure 2:
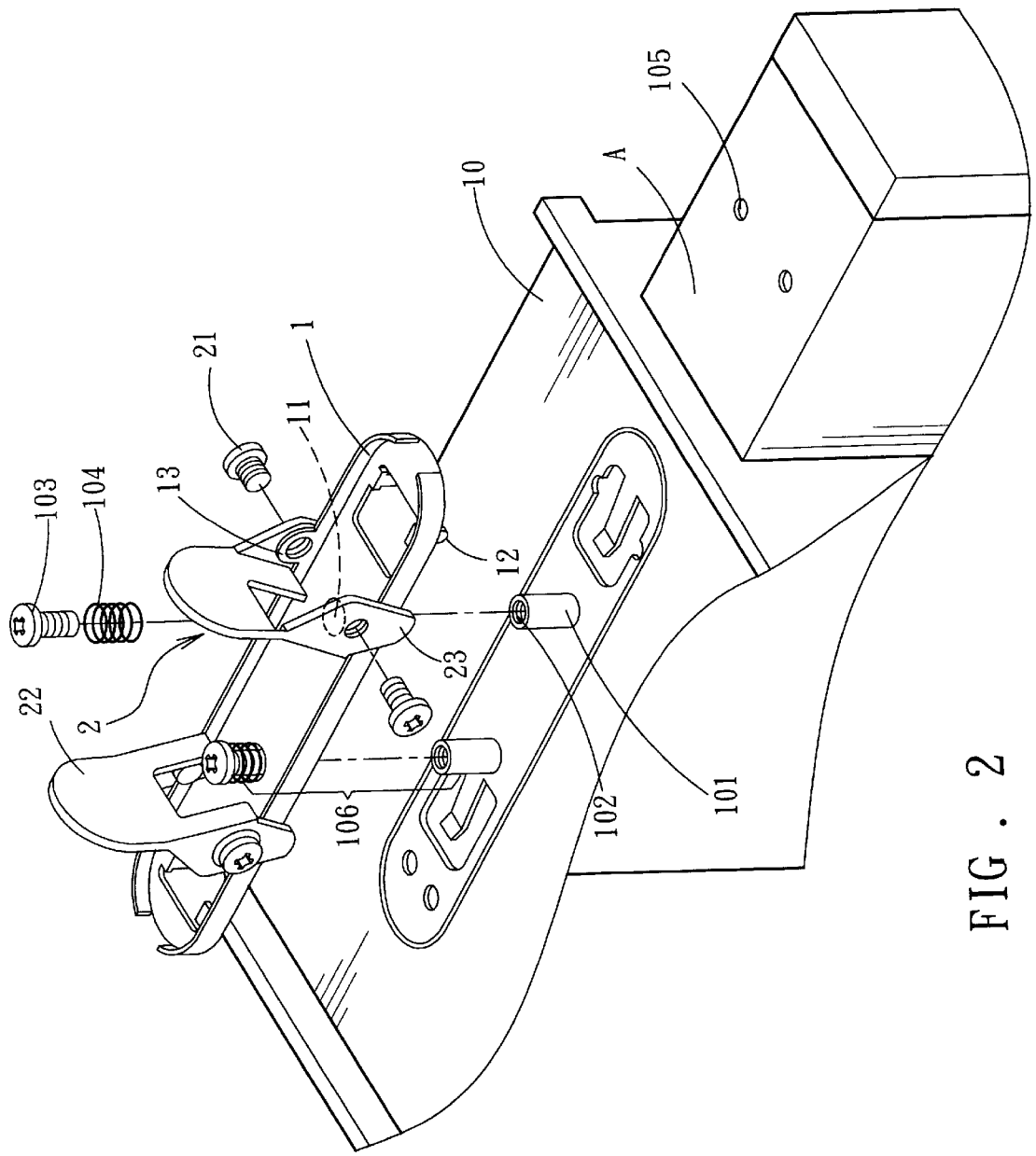
FIG. 2 is an exploded view of a first embodiment of the invention.

Please referring to FIGS. 1 and 2, the anchoring apparatus for computer drives without using screws according to the invention includes:

an installation rack 10 which has a box to house a drive A. The installation rack has a side wall which has two struts 101 extending outwards. Each strut 101 has a screw hole 102 in the center to engage with a screw 103 which couples with a returning spring 104 to form a returning structure 106. The drive A has a side wall surface which has four anchor holes 105;

an anchor plate 1 which has two holes 11 located respectively on the left side and the right side for coupling with the struts 101. The anchor plate 1 has an inner side which has four anchor stubs 12 corresponding to the anchor holes 105 of the drive A, and two pairs of lugs 13 located on the left side and the right side thereof; and two actuating members 2 pivotally engaging with the lugs 13 of the anchor plate 1 through stub shafts 21 such as bolts. Each actuating member 2 has a C-shaped driving lever 22 on an outer side to be moved by a hand. The driving lever 22 has an inner side split to form a horizontal driven end 23 on two sides to clip two sides of the anchor plate 1 in a up and down manner.

Figure 3A:
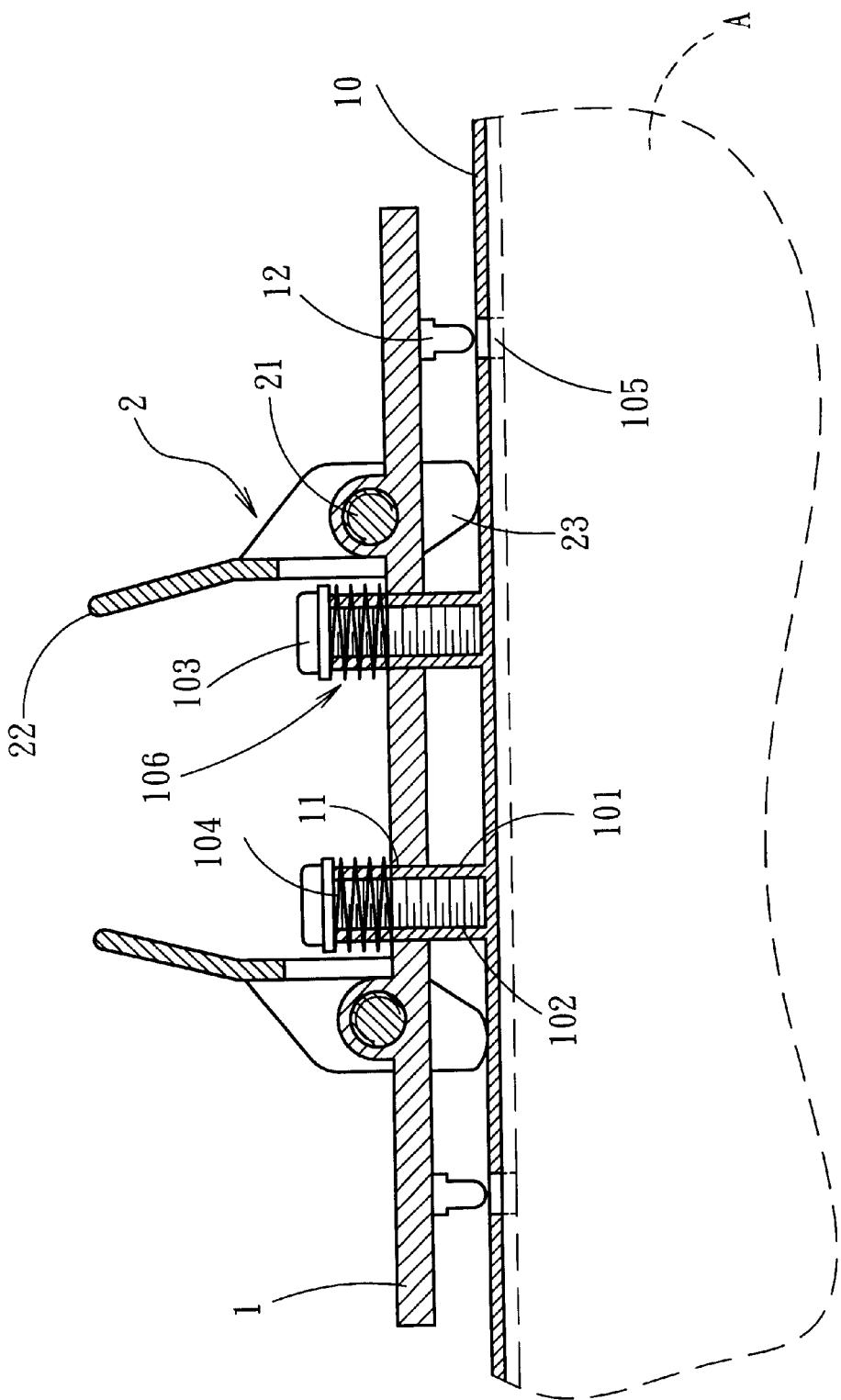
FIG. 3A is a schematic view of the first embodiment of the invention in an operating condition.
Figure 3B:
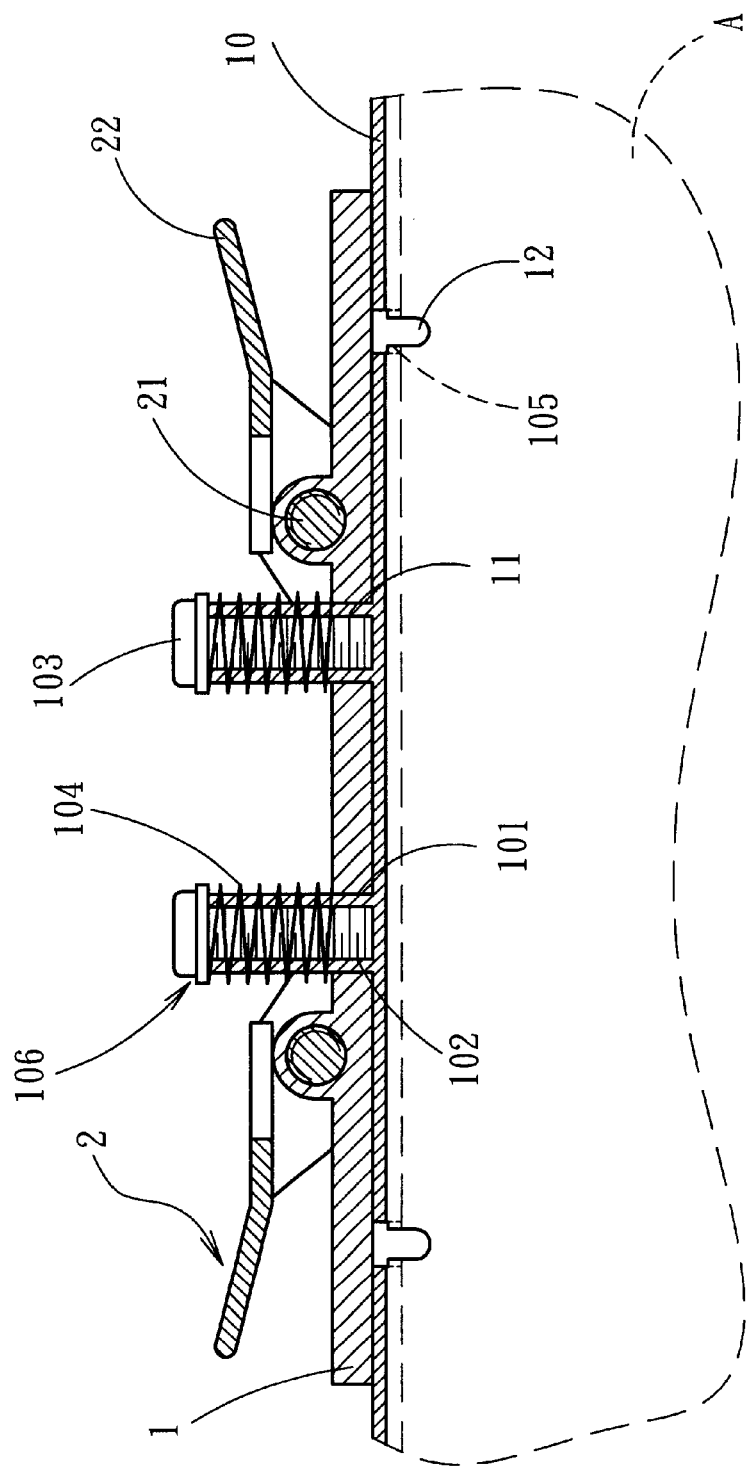
FIG. 3B is a schematic view of the first embodiment of the invention in another operating condition.

Referring to FIGS. 3A and 3B, when in use, the anchor plate 1 is pressed by the driven end 23 against the outer wall of the installation rack 10. The four anchor stubs 12 on the inner wall of the anchor plate 1 are separated from the four anchor holes 105 of the driver A so that the drive A may be removed from the installation rack 10. When the anchor plate 1 is lifted by the actuating members 2 through the driving lever 22, the driven end 23 presses the outer wall surface of the installation rack 10. As the length between the stub shaft 21 and the driven end 23 is greater than the extending length of the anchor stub 12, when the driving lever 22 is moved upwards, the driven end 23 of the actuating member 2 presses the outer wall surface of the installation rack 10 to raise the anchor plate 1 such that the four anchor stubs 12 of the anchor plate 1 are simultaneously moved away from the anchor holes 105 of the drive A, therefore the drive A housed in the box may be removed from the installation rack 10 by hand.

Figure 4:
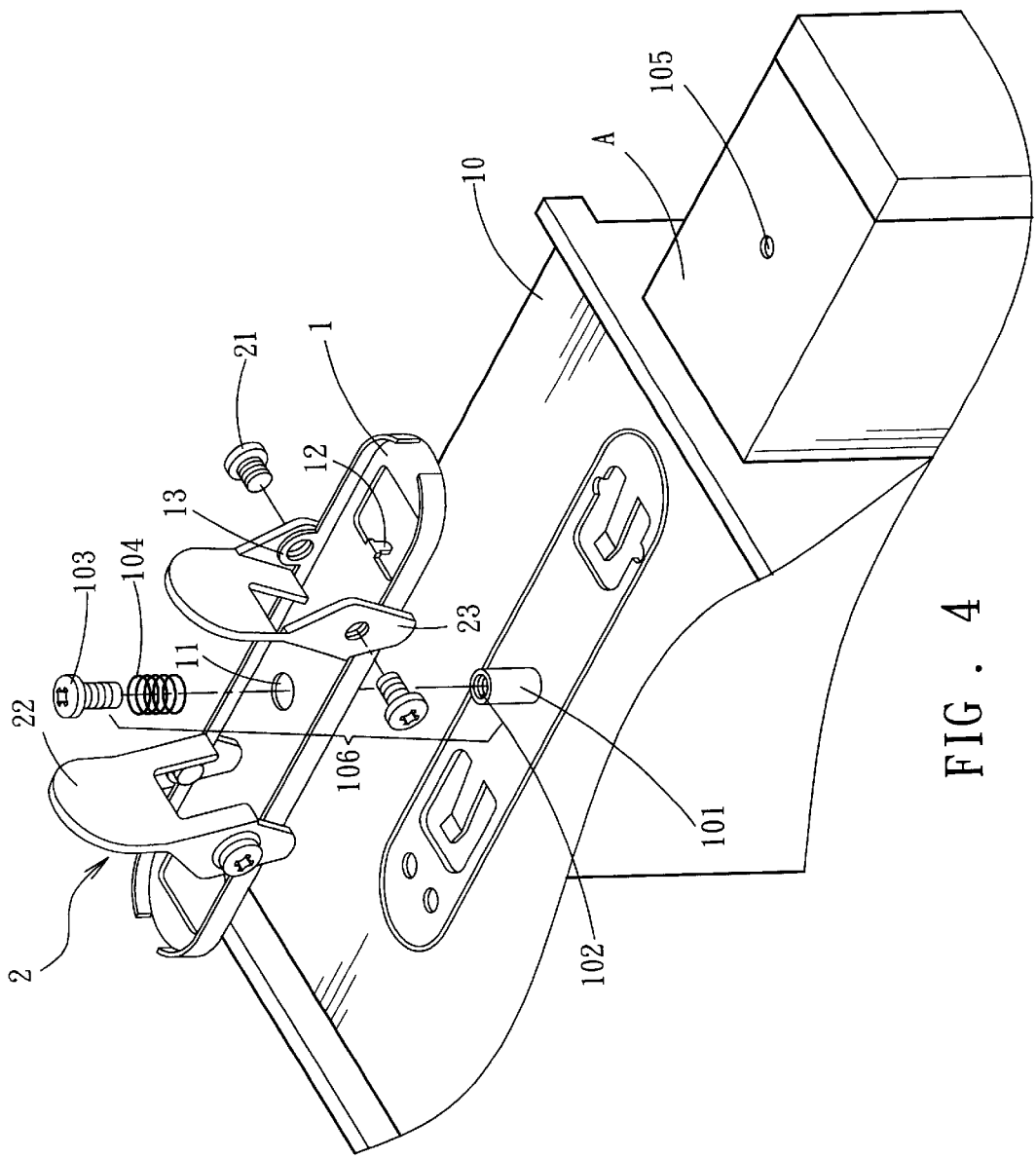
FIG. 4 is an exploded view of a second embodiment of the invention.

In contrast, when there is a desire to install the drive A in the installation rack 10, first, place the drive A into the box of the installation rack 10; next, drive the driving lever 22 of the actuating members 2 to move the driven end 23 away from the outer wall of the installation rack 10. The elastic force of the returning spring 104 pushes the anchor plate 1 to allow the anchor stubs 12 to insert into the anchor holes 105 of the drive A so that the drive A is anchored on the installation rack 10 rapidly. Of course, the invention may also adopt a structure shown in FIG. 4 in which the installation rack has only one strut 101 to couple with a hole 11 formed in the middle of the anchor plate 1. The strut 101 also is coupled with a returning spring 104 and held by a screw 103 to form a returning structure 106. Such a construction also enables the anchor plate 1 to generate returning and contact effects and enable the anchor stubs 12 of the anchor plate 1 to be inserted in the anchor holes 105 of the drive A in the installation rack 10.

What is claimed is:

1. An anchoring apparatus for computer drives, comprising:

an installation rack for housing a drive;

an anchor plate engaging with a side wall of the installation rack;

two actuating members pivotally engaging with the anchor plate through stub shafts; and an elastic returning structure;

wherein the anchor plate has anchor stubs mating with at least one anchor hole formed on the drive, with the actuating members in an original position each of the actuating members having a driving lever on one end when the actuating members are moved so that and a driven end on other end, the length between the driven end and the stub shafts being greater than the length of the anchor stubs, the anchor plate being movable to allow the anchor stubs to be moved away from the anchor holes of the drive, and the actuating members being allowed to return to the original position through the returning structure to allow place the anchor plate in contact with the installation rack and the anchor stubs to wedge in the anchor holes of the drive.

2. The anchoring apparatus of claim 1, wherein the anchor plate has four anchor stubs to wedge in four anchor holes formed on an outer wall of the drive, the returning structure including two struts extended from an outer wall of the installation rack each is engaged with a screw for coupling with a returning spring, the driving lever of the actuating member being formed in C-shape, the driven end having two sides located on two sides of the anchor plate to pivotally couple with the stub shafts.

3. The anchoring apparatus of claim 2, wherein the actuating members are symmetrically located on a left end and a right end of the anchor plate.

4. The anchoring apparatus of claim 2, wherein the anchor plate and the actuating members are pivotally engaged through the stub shafts.

5. The anchoring apparatus of claim 2, wherein the stub shafts for engaging the anchor plate and the actuating members are bolts.

6. The anchoring apparatus of claim 5, wherein the actuating members are connected about the bolts which couple the driven ends of the actuating members to the anchor plate.

7. The anchoring apparatus of claim 1, wherein two anchor stubs are formed on the anchor plate corresponding to the wall surface of the drive in the installation rack to match two anchor holes formed on the drive.

8. The anchoring apparatus of claim 1, wherein the returning structure is located in the center of the anchor plate.

9. The anchoring apparatus of claim 1, wherein the driven end of the actuating members has a distal end forming a flat anchoring surface.

* * * * *